Dec. 6, 1960 W. M. GOODALL 2,963,657
STABILIZED DIRECTLY-COUPLED AMPLIFIER
Filed Nov. 9, 1956
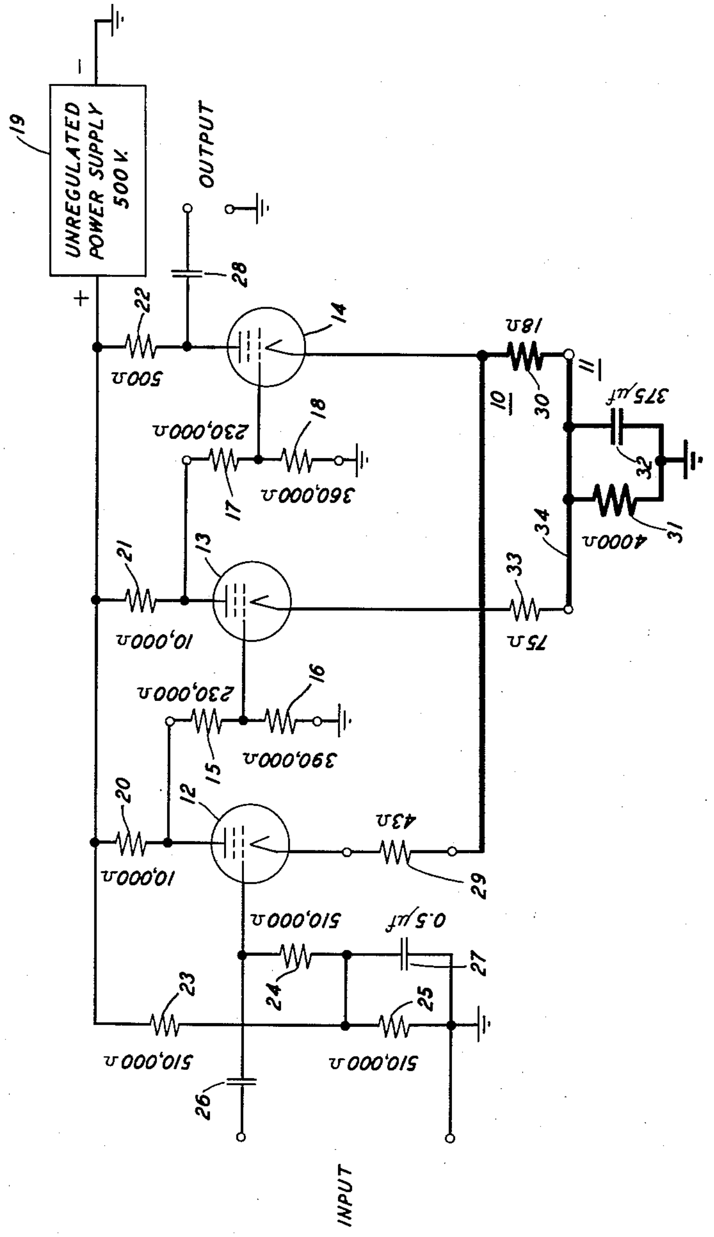
INVENTOR
W. M. GOODALL
BY Roy M. Porter, Jr.
ATTORNEY United States Patent Office 2,963,657

Patented Dec. 6, 1960

2,963,657

STABILIZED DIRECTLY-COUPLED AMPLIFIER

William M. Goodall, Holmdel, N.J., assignor to Bell Telephone Laboratories, Incorporated, New York, N.Y., a corporation of New York Filed Nov. 9, 1956, Ser. No. 621,447

5 Claims. (Cl. 330—92)

This invention relates to directly-coupled amplifiers, and more particularly to directly-coupled amplifiers stabilized by negative feedback for use with broad band alternating current signals.

Directly-coupled amplifiers, sometimes referred to as direct current amplifiers, are known to be adapted for amplifying very board band alternating current signals without frequency distortion. They are, therefore, particularly suitable for use in connection with video signals or with the base band signal of a broad band microwave transmission system. It is also known that directly-coupled amplifiers tend to be troubled by small drifts or variations in the direct current supply voltage, by aging of tubes and other components, and by similar causes of instability. For example, a very small change affecting an early stage in a high gain amplifier will be amplified many times and will so upset the bias of subsequent stages that they will either be driven into cut-off or saturation, or at least will be driven substantially out of the region of linear amplification. Numerous balancing and compensating circuits have been proposed to eliminate this difficulty. These, however, not only complicate and add to the cost of the equipment, but also generally preclude the use of desirable negative feedback for the signal frequency. An alternative is to employ carefully regulated power supplies which usually precludes the use of self-biasing features in the circuit and requires separately regulated plate and bias supplies.

It is, therefore, an object of the present invention to simplify and economically stabilize directly-coupled amplifier circuits against variations of a single unregulated direct current supply.

It is a further and more specific object to improve directly-coupled amplifiers by employing negative feedback and self-bias features in a circuit stabilized against variations in direct current supply voltage.

These objects are accomplished in accordance with the present invention by providing in a directly-coupled amplifier, a first feedback path at signal frequencies from a cathode impedance common to the first and third stages to at least the grid of the first stage, and a second feedback path at very low frequencies, or direct current from a cathode impedance common to all stages to the grid of at least the first stage. The first feedback path provides the usual improvements of negative feedback. The second feedback path causes the entire amplifier to behave at the low frequencies for which the second feedback path is effective, as a giant "cathode follower" in which the "cathode voltage" tends to follow very closely the "grid voltage." Thus, any slow change in the supply voltage, from which the direct current grid biases are derived, tends to be absorbed across the common cathode resistor so that the critical grid to cathode voltage remains substantially unchanged.

These and other objects, and the nature and features of the invention will appear more fully upon consideration of the illustrative embodiment shown in the accompanying single schematic drawing and the following detailed description thereof.

In the drawing is shown a three-stage directly-coupled amplifier to which a first common cathode circuit 10 and a second common circuit 11 have been added in accordance with the present invention. Except to the extent indicated hereinafter, the directly-coupled amplifier is conventional and comprises a first stage amplifying tube 12, a second stage amplifying tube 13 and a final stage power amplifying tube 14. An interstage resistance-divider circuit 15—16 connects the plate of the first stage 12 to the grid of the second stage 13 through resistance 15 and thence to ground through resistance 16; an interstage resistance-divider circuit 17—18 connects the plate of stage 13 to the grid of the third stage 14 through resistance 17 and thence to ground through resistance 18; and unregulated power supply 19 for the direct current plate voltage is connected through plate resistors 20, 21 and 22 to the plates of tubes 12, 13 and 14, respectively. A very broad band, or video signal, is supplied to the amplifier by condenser 26 across grid resistor 24 of tube 12. The lower end of resistor 24 is returned to the input resistance-divider circuit 23—25 connected between the plate supply and ground and is suitably by-passed to ground by condenser 27. The output is taken between the plate of tube 14 and ground through condenser 28. The circuit thus far described is conventional and need not be discussed in further detail.

In accordance with the invention the cathodes of the three stages are connected as follows: The cathode of tube 14 is connected to ground through a small resistor 30 in series with a larger resistance 31. Resistance 31 is by-passed by a condenser 32 of very large capacity so that condenser 32 has a very small reactance and the bus 34 representing the junction between resistors 30 and 31 is substantially at ground for all frequencies within the signal band. The cathode of tube 13 is connected through a resistor 33 to bus 34 and the cathode of tube 12 is connected through resistor 29 to the cathode of tube 14. Thus, resistor 30 is common to the cathode circuits of the first and third stages and in conjunction with resistor 29 comprises the common cathode circuit 10. This circuit provides negative feedback at the signal frequencies from the third stage to the first stage in accordance with well-known principles of feedback which determine the relative values of resistors 29 and 30 and if necessary, the relative frequency characteristics of the interstage circuits. Resistor 31 is common to the cathode circuit of all three stages and together with by-pass condenser 32 comprises the common cathode circuit 11, the function of which will be described in detail hereinafter.

Illustrative values for the various elements of the directly-coupled amplifier and the common cathode circuits 10 and 11 have been shown in the drawing, and it is believed that the invention will be more readily comprehended if it is assumed that the circuit is comprised of elements having the values shown. It should be understood, however, that these values are merely illustrative and that they are neither critical nor limiting.

Thus, the values of plate load resistors 20, 21 and 22 are chosen with a view to proper operation of the particular tube types selected in accordance with well-known principles. The voltage of plate supply 19 is approximately twice the required plate voltage for these tubes. Then the value of resistor 31 is chosen so that with normal conduction of the three stages and with the selected supply voltage, one-half the supply voltage is dropped across resistance 31 with the remainder appearing across the tubes and their plate load resistors. The values of resistors 23 and 25 of the input voltage divider are substantially equal so that tube 12 operates near zero bias relative to bus 34. The direct current voltage across resistors 29 and 30 is negligible compared to the drop across resistance 31. The relative values of interstage resistance dividers 15—16 and 17—18 are then set to properly bias tubes 13 and 14, respectively.

Several approaches might be followed in explaining the compensating action of common cathode circuit 11. The simplest is based upon the realization that it constitutes the cathode impedance of a large cathode follower in which the conduction paths of all stages may be considered as constituting the conduction path of the cathode follower. As is well known, the inherently large negative feedback of a cathode follower insures that the cathode voltage thereof closely follows the voltage applied to its grid regardless of the plate supply voltage, the plate load resistance, or the amplification factor of the tube.

Thus, a slow change in supply voltage, for example, an increase thereof with respect to ground, will also increase the direct current voltage applied to the grids with respect to ground. The total conduction current of the stages will increase very slightly, only enough so that the voltage of bus 34 with respect to ground (representing the cathode voltage of the hypothetical cathode follower) approaches the new grid voltage. This leaves the critical bias of the stages (the voltage between their grids and bus 34) substantially unchanged. It has been found that a variation of as much as ±20 percent in the supply voltage of the circuit illustrated may be made without adversely affecting the signal frequency operation of the amplifier.

At signal frequencies, bus 34 is at ground. The applied signal, therefore, appears between the grid and cathode of each stage with no portion of it being developed across resistance 31. Thus, a signal receives full amplification except for the negative feedback developed across unbypassed resistors 29 and 30, the desirable effect of which is clearly understood by the art.

It has been convenient for illustrative purposes to represent "ground" as the negative terminal of the power supply 19 in accordance with usual schematic practice. However, the positive terminal of the power supply may be grounded with certain advantages. In particular, this connection permits the use of a high capacity, low voltage output condenser which assures low frequency response, and it removes the power supply from the output circuit which improves high frequency response. If such a modification is made, the returns of all grid circuits must still be made to the negative side of resistor 31, or the negative terminal of the power supply and not to ground so that the direct current voltage developed across resistance 31 appears in the grid to cathode circuit of each stage.

In all cases, it is understood that the above-described arrangements are simply illustrative of one of the many possible specific embodiments which can represent applications of the principles of the invention. Numerous and varied other arrangements can readily be devised in accordance with these principles by those skilled in the art without departing from the spirit and scope of the invention.

What is claimed is:

1. In a directly-coupled amplifier having a plurality of stages, a direct-current source of plate supply voltage having a positive terminal and a negative terminal; each of said stages having at least a plate, a cathode, and a control grid; individual impedances connecting the respective plates of said stages to said positive terminal, a junction; circuits connecting the cathodes of said stages to said junction; a common impedance having a low value at signal frequencies and a high value at direct current connected between said junction and said negative terminal so that all of the plate-cathode current of each stage flows through said common impedance; means for coupling an input signal to be amplified into the first of said stages; means for coupling the amplified signal output appearing between said negative terminal and the plate of each preceding stage from said preceding stage to each succeeding stage where it appears between said negative terminal and the grid of said succeeding stage; and a voltage divider circuit connected across said source, the grid of the first of said stages being returned to a point on said divider that biases said grid to a value comparable to the direct-current voltage drop across said common impedance.

2. The amplifier according to claim 1 wherein said common impedance comprises a resistance having a value across which normal combined conduction currents of said stages produce a voltage equal to substantially one-half of said supply voltage and a large capacitance connected in parallel with said resistance.

3. The amplifier according to claim 2 including a second resistance connected between said common impedance and the cathodes of two stages that have another stage therebetween, the cathode of said stage therebetween being connected to the common junction of said second resistance and said common impedance.

4. In a directly-coupled amplifier having first, second and third amplifier stages connected in tandem, each of said stages having at least a plate, a cathode, and a control grid, a source of plate supply voltage, a first voltage divider circuit connected between the positive and negative terminals of said supply voltage, the plate of said first stage being connected to one point on said divider circuit, the grid of said second stage being connected to a point negative with respect to said one point on said divider circuit, a second voltage divider circuit connected between the positive and negative terminals of said supply voltage, the plate of said second stage being connected to one point on said second divider, the grid of said third stage being connected to a point negative with respect to said one point on said second divider circuit, an impedance connected between the plate of said third stage and the positive terminal of said supply voltage, an output circuit connected to the plate of said third stage, an input circuit connected to the grid of said first stage, and an impedance common to all stages interposed between the negative terminal of said supply voltage and the cathodes of said stages, said common impedance having a value that is low at signal frequencies and high at direct current.

5. A directly-coupled amplifier having three stages connected in tandem, each of said stages having at least a plate, a cathode, and a control grid; a source of plate supply voltage; means for connecting said plates to the positive terminal of said source; means for applying a voltage to said grids more negative than the voltage on the plate of the preceding stage, including a resistor connected between the plate of the preceding stage and the grid of the succeeding stage for coupling the preceding stage to the succeeding stage; a first junction point; circuits connecting the cathode of the first and the cathode of the third of said stages to said first junction point; a first feedback path comprising a first impedance connected from said first junction point through a series impedance to the cathode of said second stage; and a second feedback path comprising a second impedance connected between the junction of said series impedance and said first impedance and the negative terminal of said source, said second impedance having a value that is very low at signal frequencies and high for direct current.

References Cited in the file of this patent

UNITED STATES PATENTS

| | | |
|---|---|---|
| 2,313,122 | Brubaker | Mar. 9, 1943 |
| 2,324,797 | Norton | July 20, 1943 |
| 2,559,515 | Pourciau | July 3, 1951 |
| 2,601,271 | French et al. | June 24, 1952 |
| 2,760,144 | Crandon et al. | Aug. 21, 1956 |

FOREIGN PATENTS

| | | |
|---|---|---|
| 527,516 | Canada | July 10, 1956 |